United States Patent [19]

Chlus et al.

[11] Patent Number: 4,747,750
[45] Date of Patent: May 31, 1988

[54] TRANSITION DUCT SEAL

[75] Inventors: Wieslaw A. Chlus, Wethersfield; Stephen E. Potz, East Hartford; Arthur W. Lucas, Jr., West Hartford, all of Conn.

[73] Assignee: United Technologies Corporation, Hartford, Conn.

[21] Appl. No.: 819,943

[22] Filed: Jan. 17, 1986

[51] Int. Cl.[4] .............................................. F04D 29/08
[52] U.S. Cl. .................................. 415/172 A; 415/138
[58] Field of Search .................... 415/115, 116, 170 R, 415/134, 136, 138, 139, 210, 172 A, 199.5

[56] References Cited

U.S. PATENT DOCUMENTS

| | | | |
|---|---|---|---|
| 3,056,583 | 10/1962 | Varadi et al. | 415/170 R |
| 3,623,736 | 11/1971 | Petrie | 415/170 R |
| 4,397,471 | 8/1983 | Feldman et al. | 415/115 |
| 4,553,901 | 11/1985 | Laurello | 415/138 |

Primary Examiner—Abraham Hershkovitz
Assistant Examiner—John Kwon
Attorney, Agent, or Firm—Charles A. Warren

[57] ABSTRACT

An inner wall for a transition duct between the high pressure and low pressure turbines of a multirotor gas turbine engine in which the wall structure itself is made up of multiple aligned segments which are bolted to the inner shrouds of the vane clusters of the low pressure turbine and in which the segments are secured to forward and rearward cone elements with one of said elements bolted securely to the segments and the other cone having free axial and radial movement with respect to the segments with the cone elements supporting at their inner edges a seal element to cooperate with a rotating element on a low pressure rotor.

4 Claims, 2 Drawing Sheets

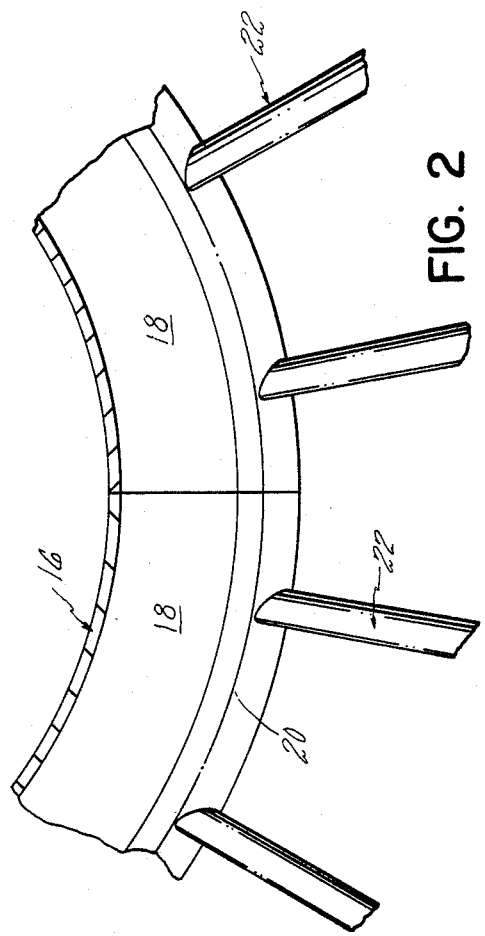

TRANSITION DUCT SEAL

DESCRIPTION

1. Technical Field

In a multispool gas turbine the space between the high pressure turbine rotor and the low pressure rotor has the inner wall of the gas path made up of segments bolted to the inner shrouds of the low pressure turbine vane sets and carries a supporting structure including opposing cones for the seal that cooperates with a rotating seal on a low pressure rotor.

2. Background Art

To minimize leakage in this area it is necessary to seal at several locations and to maintain structural durability of the assembly under operating loads. The seal locations are between the high pressure turbine discharge flow path and the cavity at the rear of the high pressure turbine disk, between this cavity and the cavity forward of the low pressure turbine disk, between the transition duct and the space internal to the duct, and between a space internal to the low pressure turbine vane and the cavity forward of the low pressure turbine disk. To permit the necessary thermal expansion, there must be freedom for relative movement between parts of the structure and still assure precise spacing between the several seal elements and other parts of the structure. Reducing leakage in these regions will significantly increase the overall performance of the engine.

DISCLOSURE OF INVENTION

The present invention has a duct seal composed of multiple segments that together form a conical inner wall for the gas path between the high and low pressure turbines. These segments are bolted to and extend forwardly as an extension of the inner shrouds of the platforms for the multiple clusters of low pressure vanes. These segments are bolted near their forward ends to a forward cone which serves as a thrust balance seal support. At the rear each segment is bolted to a rear sheet metal cone that is radially and axially free at the vane shroud connections to the segments to minimize thermal stress. The forward and rearward cones are bolted together at their inner ends. The forward cone may carry a seal element cooperating with a high pressure turbine disk and the rear cone may carry a seal element cooperating with structures on the low pressure turbine disk.

The foregoing and other objects, features and advantages of the present invention will become more apparent from the following description of preferred embodiments and accompanying drawings.

BRIEF DESCRIPTION OF THE DRAWINGS

FIG. 2 is a sectional view along the line 2—2 of FIG. 1.

BEST MODE FOR CARRYING OUT THE INVENTION

Figure 1:
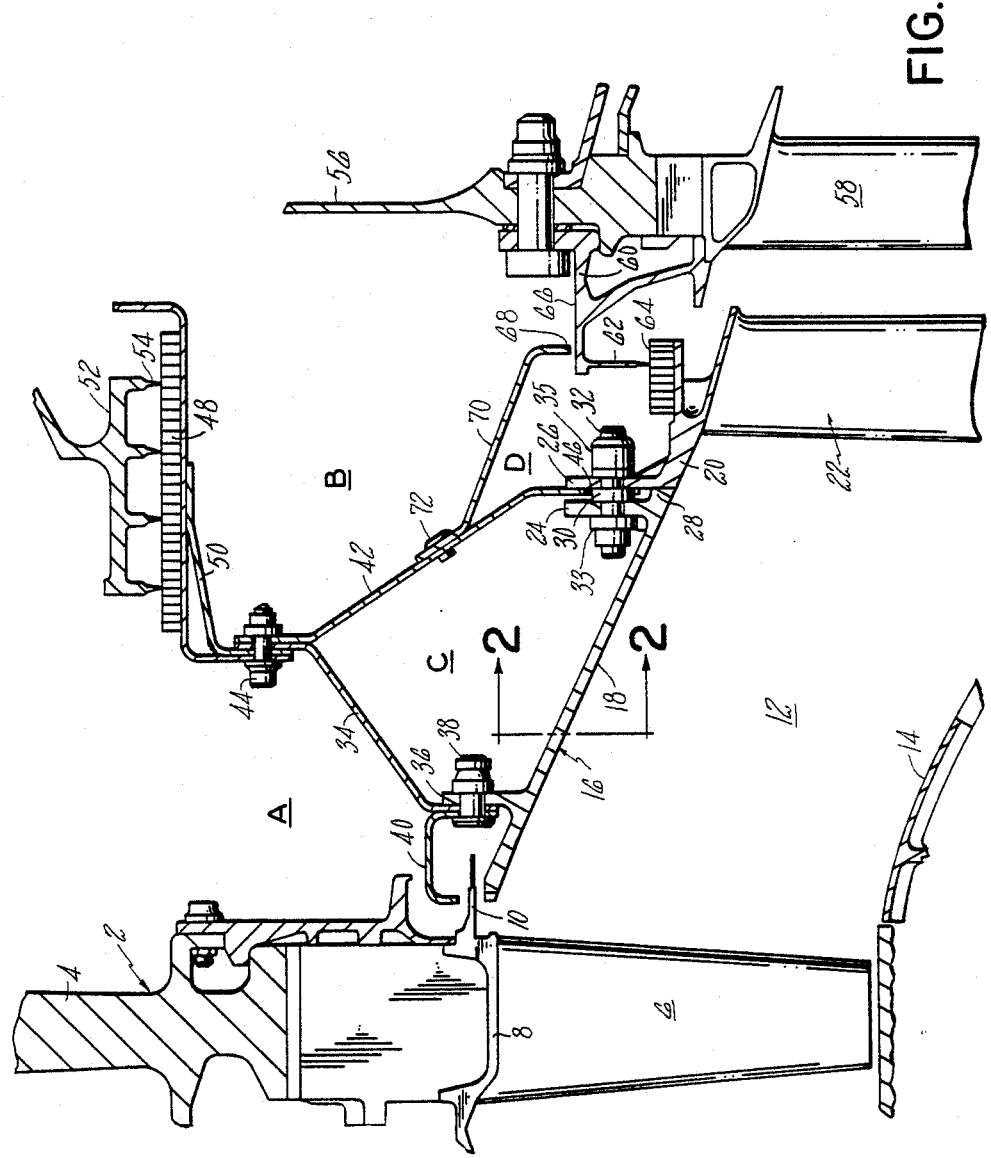
FIG. 1 is a longitudinal sectional view through a part of a gas turbine.

The drawing shows a second stage turbine 2 of a high pressure rotor having a disk 4 and a row of blades 6 on its periphery. The blade shrouds 8 have rearwardly projecting flanges in alignment to form an annular rib 10 to function as a sealing element as will be described.

Gas from the high pressure turbine enters the gas path 12 to the low pressure turbine and this path is formed by an outer wall 14 and a segmented inner wall 16, the latter being made up of multiple segments 18 (see FIG. 2). There is preferably one segment attached to the inner shroud 20 of each vane cluster 22 of the row of vanes at the inlet to the low pressure turbine. There are generally 2 or 3 vanes in each cluster, so the number of segments is less than the number of individual vanes.

These segments have flanges 24 at their rearward ends that are bolted to mating flanges 26 on the vane shrouds. The flanges 24 and 26 are held apart by a projecting end 28 of the segment engaging the shroud and by a shoulder bolt spacer 30 located within the slot formed between the flanges. The shoulder bolts 32 hold the parts in assembled relation by means of a D-nut 33 and a nut 35. The spacer 30 is an integral feature of the shoulder bolt 32.

The segments and the vane shrouds serve to support a forward cone 34 held at its outer end to flanges 36 on and near the forward end of the segments and bolts 38 hold this cone in position on the segments. The bolts also support a seal element 40 that extends forwardly to cooperate with the seal rib 10. The inner edge of the forward cone 34 is bolted to the inner edge of a rearward cone 42 as by bolts 44. This rearward cone 42 extends outwardly and has slots 46 in its outer periphery to extend over the shoulder bolts 32 to be guided thereby. Axial movement of this cone is limited by its position between the two flanges 24 and 26. Thus axial and radial freedom at this point allows for the necessary thermal expansion during turbine operation.

The bolts 44 at the inner edges of the cones also support a sealing cylinder 48 braced by a flanged damper 50 engaging and held by the bolts 44. This sealing cylinder cooperates with an annular sealing element 52 carried by the low pressure rotor and having sealing fins 54 to cooperate with the cylinder 48. The low pressure rotor also carries a first stage rotor disk 56 having blades 58 on its periphery downstream of the row of vanes 22 and this disk carries on its upstream side a ring 60 having a seal fin 62 cooperating with a sealing surface 64 on the inner sides of the shrouds 20. This ring 60 also has an inwardly facing surface 66 to cooperate with a sealing fin 68 on the rearward edge of a ring 70 suitably secured to the rearward cone 42 as by rivets 72.

In this way the seal element 40 controls leakage between the gas path at the downstream end of the high pressure turbine and the cavity A rearward of the high pressure turbine disk. The cones 34 and 42 and the seal at the cylinder 48 limits the leakage from cavity A to cavity B forward of the low pressure disk. The cones also limit leakage directly from the space C between the disks because these cones are continuous and with no leakage from space C there is a minimum of leakage past the mating edges of the segments. The seal ring 70 minimizes leakage from space B to space D outward of the ring 70 and this minimizes leakage between space B and the gas path. The support of the structure from the segments which in turn are supported from the vane shrouds makes a secure arrangement which will hold the seal elements in most effective relation and still permit the necessary thermal changes in dimension. The structure meets the durability requirements for high pressure engines and still provides the necessary sealing at the several locations described.

It should be understood that the invention is not limited to the particular embodiments shown and described herein, but that various changes and modifications may be made without departing from the spirit and scope of this novel concept as defined by the following claims.

We claim:

1. In combination with high and low pressure turbines, a transition duct including a seal structure for positioning between high and low pressure turbine rotors in a multirotor engine, the low pressure turbine rotors having low pressure turbine vanes arranged in clusters downstream of the high pressure turbine, and each cluster being attached to an inner shroud, the seal structure comprising:

a plurality of segments arranged in a ring and forming an inner wall of the transition duct between the high and low pressure turbines, and each segment being bolted to one of the shrouds, a forward cone secured to and extending inwardly from adjacent the forward portions of the segments, a rearward cone secured to the forward cone at its inner edge and having a connection at its outer edge to the segments near the shrouds, and a seal element secured to the inner edges of said cones and wherein the segments and shrouds have flanges by which they are connected together and these flanges are spaced apart forming a slot to receive between them the outer end of the rearward cone and wherein the slot is wider than the thickness of the rearward cone, and wherein the connection between the rearward cone and the segments leaves a freedom of movement in both axial and radial directions.

2. A seal structure as in claim 1 in which the cones are continuous and, being bolted together at their inner edges, form a support structure for the segments.

3. A seal structure as in claim 1 in which the rearward cone has slots in its periphery and the segments and shroud are held together by bolts over which the slots fit.

4. A seal structure as in claim 1 in which the segments and shrouds have flanges by which they are bolted together and these flanges are spaced apart to receive the outer edge of the rearward cone therebetween and the outer edge of the cone has slots therein to fit over the bolts holding the segments and shrouds together.

* * * * *